(12) United States Patent
Kramarenko et al.

(10) Patent No.: US 8,812,694 B2
(45) Date of Patent: Aug. 19, 2014

(54) DIALOG ESTABLISHMENT OVER A PEER-TO-PEER ARCHITECTURE

(75) Inventors: Valentina Iqorevna Kramarenko, Milton (CA); Swee Tuan Pang, Oakville (CA); Boris Rozinov, Richmond Hill (CA); Mee Tchin Jane John Chuan, Richmond Hill (CA)

(73) Assignee: BlackBerry Limited, Waterloo, Ontario (CA)

( * ) Notice: Subject to any disclaimer, the term of this patent is extended or adjusted under 35 U.S.C. 154(b) by 427 days.

(21) Appl. No.: 13/334,960

(22) Filed: Dec. 22, 2011

(65) Prior Publication Data
US 2013/0166761 A1    Jun. 27, 2013

(51) Int. Cl.
*G06F 15/16*    (2006.01)
(52) U.S. Cl.
USPC .......................................................... 709/228
(58) Field of Classification Search
None
See application file for complete search history.

(56) References Cited

U.S. PATENT DOCUMENTS

| | | | |
|---|---|---|---|
| 7,296,075 B2* | 11/2007 | Lynggaard | 709/227 |
| 7,818,453 B2* | 10/2010 | Haumont et al. | 709/245 |
| 7,886,057 B2* | 2/2011 | Rosenberg et al. | 709/227 |
| 8,051,161 B2* | 11/2011 | Hu et al. | 709/223 |
| 2007/0266125 A1* | 11/2007 | Lu et al. | 709/222 |
| 2007/0299942 A1* | 12/2007 | Lu et al. | 709/220 |
| 2011/0137745 A1* | 6/2011 | Goad et al. | 705/26.9 |

OTHER PUBLICATIONS

Rosenberg Jdrosen Net J "Interactive Connectivity Establishment (ICE): A Protocol for Network Address . . . " Apr. 30, 2010.
European Search Report from corresponding EP application No. 11195362.6 dated Jun. 12, 2012.

* cited by examiner

*Primary Examiner* — Brian P Whipple
(74) *Attorney, Agent, or Firm* — Gowling Lafleur Henderson LLP

(57) ABSTRACT

A device and method are described for establishing a dialog between Internet Protocol (IP) end points using a peer-to-peer (P2P) architecture. The device, method and computer readable memory utilize servers to determine one or more possible addresses to attempt the dialog establish using. The device and methods described allow for an early discovery of an end point address which can be used for the dialog establishment.

20 Claims, 5 Drawing Sheets

DIALOG ESTABLISHMENT OVER A PEER-TO-PEER ARCHITECTURE

TECHNICAL FIELD

The current disclosure relates to the establishment of a dialog between Internet Protocol (IP) capable end points, and in particular to the establishment of a dialog using a peer-to-peer infrastructure.

BACKGROUND

Establishing a communication dialog between two end points allows content to be exchanged between the two end points via Internet Protocol (IP) networks. The content may be messages such as instant messages (IM), audio and/or video for phone calls, or any other type of content. In order to establish a dialog between two end points, each end point must be able to discover the address of the other end point to use in the subsequent dialog establishment and must be able to send and receive information to and from the other end point. The ends point may be any IP capable computing device such as but not limited to smart phones, computers, netbooks, laptops, desk phones, audio or video conferencing devices or any device that is capable to two-way IP communication.

The discovery of an end point address, and the subsequent dialog establishment, can be accomplished using intermediary servers. For example, the Session Initiation Protocol (SIP), an IETF-defined signaling protocol widely used for controlling communication sessions such as voice and video calls over IP, provides for address discovery by using location services in a SIP proxy/registrar. When a first party wishes to establish a dialog with an end point associated with a second party, a transaction can be initiated with a SIP proxy/registrar server of the second party. Any end points associated with the second party can register addresses with the SIP proxy/registrar, and these addresses can be returned to the first party. In one illustrative dialog establishment message flow, the first party sends an INVITE message that includes its address information. The INVITE message is routed to the SIP proxy/registrar server associated with the second party. The SIP proxy/registrar determines the address of the end point device of the second party and forwards the INVITE message to the address. The end point of the second party receives the INVITE message, and if they wish to establish a dialog, sends a 200 OK message back to the SIP proxy/registrar, which includes the address information of the second end point. The 200 OK message is routed back to the end point of the first party, and the address information of the second party is used to establish a dialog directly between the two end points. With the address information exchanged, the dialog can be established without requiring messages be routed through the SIP proxy/server. Although the use of the SIP proxy/registrar allows for the discovery of end point addresses and subsequent dialog establishment, the use of proxy servers can be problematic from a scalability point of view.

A peer-to-peer (P2P) architecture may be used as an alternative to the SIP proxy and registrar infrastructure when discovering addresses of end points and establishing dialogs. In a P2P architecture there is no central servers that can provide the address associated with an end point as is the case with the proxy/registrar servers described above. Any address for dialog establishment must first be discovered using the P2P architecture. In a mobile environment, in which devices may lose communication periodically, or change addresses frequently, the address discovery is complicated and can cause performance issues with the dialog establishment. Further, the use of a P2P architecture is complicated by network address translation (NAT) and firewall issues, since a message may be received from an unknown location which may not be able to cross the NAT or firewall.

Therefore there is a need for an improved method of discovering addresses and establishing dialogs in a P2P architecture.

BRIEF DESCRIPTION OF THE DRAWINGS

Various embodiments are described with reference to the drawings, in which.

It will be noted that throughout the appended drawings, like features are identified by like reference numerals.

DETAILED DESCRIPTION

Figure 1:
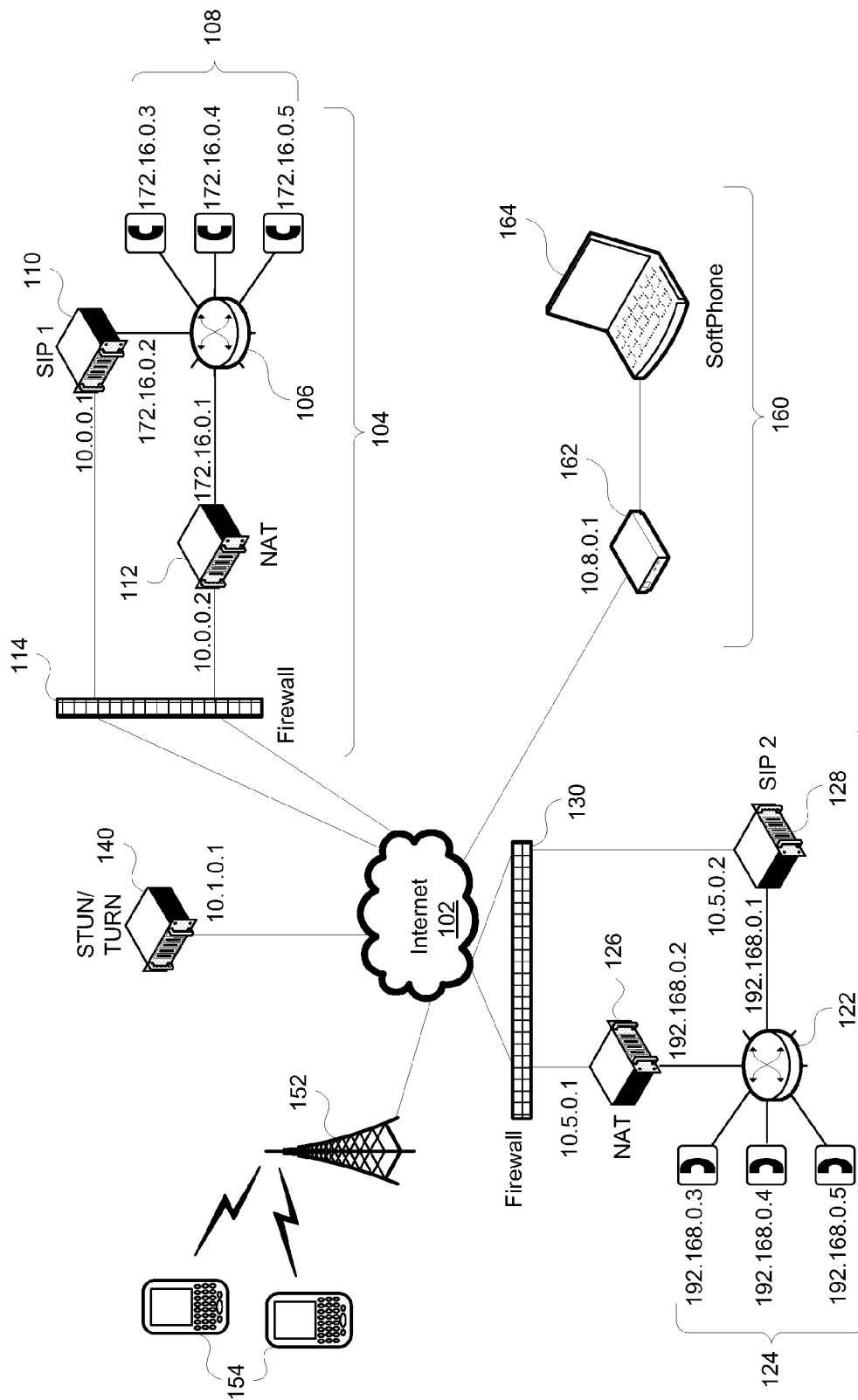
FIG. 1 depicts a network environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. Embodiments are described below, by way of example only, with reference to FIGS. 1-15.

In accordance with the present description there is provided a method of establishing a communication dialog between two end points using peer-to-peer (P2P) messaging. The method comprises initiating from an initiating end point a session initiation protocol (SIP) transaction with an intermediary server by sending a SIP message comprising a recipient identifier (ID) of a desired party of the communication dialog, and an initiator candidate list of possible communication addresses of the initiating end point; receiving at the initiating end point at least one provisional response each comprising a respective recipient candidate list of possible communication addresses of a respective recipient end point of a plurality of recipient end points associated with the recipient ID; determining at least one address to establish the communication dialog with, from the at least one received recipient candidate lists, each of the at least one determined addresses for use in establishing the communication dialog between the initiating end point and the respective recipient end point; receiving a final response of the SIP transaction from a further one of the plurality of recipient end points; and attempting to establish the communication dialog using a P2P architecture between the initiating end point and one or more of the determined at least one address.

In accordance with the present description there is further provided a device for establishing a communication dialog between two end points using peer-to-peer (P2P) messaging. The device comprises a memory storing instruction; and a processor executing instructions stored in the memory. When the instructions are executed by the processor they configure the device to provide initiation, from an initiating end point, of a session initiation protocol (SIP) transaction with an intermediary server by sending a SIP message comprising a recipient identifier (ID) of a desired party of the communication dialog, and an initiator candidate list of possible communication addresses of the initiating end point; receipt, at the initiating end point, of at least one provisional response each comprising a respective recipient candidate list of possible communication addresses of a respective recipient end point of a plurality of recipient end points associated with the recipient ID; determination of at least one address to establish the communication dialog with from the at least one received recipient candidate lists, each of the at least one determined addresses for use in establishing the communication dialog between the initiating end point and the respective recipient end point; receipt of a final response of the SIP transaction from a further one of the plurality of recipient end points; and establishment of the communication dialog using a P2P architecture between the initiating end point and at least one of the determined one or more addresses.

In accordance with the present description there is further provided a computer readable memory comprising instructions that when executed by a processor of a device configure the device to provide initiation, from an initiating end point, of a session initiation protocol (SIP) transaction with an intermediary server by sending a SIP message comprising a recipient identifier (ID) of a desired party of the communication dialog, and an initiator candidate list of possible communication addresses of the initiating end point; receipt, at the initiating end point, of at least one provisional response each comprising a respective recipient candidate list of possible communication addresses of a respective recipient end point of a plurality of recipient end points associated with the recipient ID; determination of at least one address to establish the communication dialog with from the at least one received recipient candidate lists, each of the at least one determined addresses for use in establishing the communication dialog between the initiating end point and the respective recipient end point; receipt of a final response of the SIP transaction from a further one of the plurality of recipient end points; and establishment of the communication dialog using a P2P architecture between the initiating end point and at least one of the determined one or more addresses.

FIG. 1 depicts a network environment in which dialogs can be established between various Internet Protocol (IP) enabled end points. For clarity, the established dialogs are described herein as being used to exchange audio between end points providing voice communication capabilities to the end points. It is contemplated that the established dialogs may be used to exchange various different types of content between two end points. The content may include for example audio, video, text, instant messages (IM), or data files.

The network environment 100 comprises a plurality of interconnected devices. The devices are depicted as being connected to the Internet 102. It is noted that in the Figures and description, all of the IP addresses are depicted as being private IP addresses that are reserved in IPv4. It should be appreciated that public facing interfaces would be associated with a public IP address. Addresses within the reserved 10.X.X.X address range are intended to represent public addresses in the Figures and description. Further, although described herein with regards to IPv4 addresses, it is contemplated that the devices may also be provided with IPv6 addresses. It will be appreciated that the network environment 100 is intended to be illustrative of various possible connections that may occur, and certain aspects of a particular implementation are omitted.

The network environment 100 comprises two internal networks 104, 120, which could be for example a corporation's internal network, connected to the Internet 102. Each of the two internal networks 104, 120 are depicted as having the same components. Turning to internal network 104, a plurality of SIP end points 108, which could be a Voice-Over-Internet-Protocol (VoIP) handset on a desk, a VoIP or video soft phone on a computer or similar end point, video conference device, wireless or mobile device, are connected to the internal network by one or more network appliances 106 such as a router, bridge, access point, wireless access points etc. As depicted, each end point 108 is associated with an IP address of the internal network. The network 104 also comprises a SIP registrar server 110 that is connected to the network by a network appliance 106. The SIP registrar 110 is accessible from the Internet. In FIG. 1, the SIP registrar 110 is depicted as having its own public facing interface. It is contemplated that the SIP registrar could be accessible through a network address translation (NAT) device 112; however such a NAT device 112 should be configured to allow originating messages to be sent from the Internet 102 to the SIP registrar 110, for example by using port forwarding or a similar technique.

A NAT device 112 may be used to allow the plurality of devices 108 on the internal network to connect to the Internet 102 using a single public IP address. Although a single public IP address is depicted for the NAT device 112, it is contemplated that the NAT device 112 could include a plurality of public IP addresses. The network 104 may also include a firewall 114 that is used to block or allow particular traffic to and from the network 104. The functionality of the NAT device may be incorporated in a firewall device, or other network devices.

As depicted, the internal network 120 is similar to internal network 104. It comprises a plurality of end points 124 connected to one or more network appliances 122. The internal network 120 may also include a SIP registrar 128 and a NAT device 126 coupled to the network appliance 122 as well as a firewall 130.

Other devices or systems that may be connected in the network environment 100 include a mobile or cellular infrastructure 152 and a plurality of mobile devices 154, 156. The mobile infrastructure may be wireless wide area networks (WWAN), wireless metropolitan area networks (WMAN), wireless local area network (WLAN), wireless personal area network (WPAN) or hot spot. For example any number of wireless technologies may be utilized such as but not limited to GSM, CDMA, 1xRTT, HSPDA, LTE, WiFi, or Wi-Max standards. A home computer 160 or network may also be connected to the Internet 102. As depicted, a modem, such as a cable or digital subscriber line (DSL) modem, 162 may be used to connect the computing device 164 to the Internet 102. The home network could include a plurality of computing devices connected via a router (not shown), but may also provide wireless network access through for example WiFi to either fixed wireless network access devices or transitory mobile device 163 when they are within network range. The mobile devices may move between wireless networks and acquire different network addresses from the networks.

It will be appreciated that the depiction of the network environment 100 is only intended to be illustrative and other embodiments are possible. For example, one or more of the internal networks may include WiFi access, or other wireless access technologies, for providing access to the network and/or the Internet to mobile devices. Further, the following description is described with regards to establishing a voice over internet protocol (VoIP) call between a device on the internal network 120 and the internal network 108. It is contemplated that the VoIP call can be initiated from and to devices outside of the described networks.

As described further herein, a dialog may be established between two end points using a P2P architecture. A P2P architecture may be provided as an overlay of networked devices at the application layer. The P2P architecture allows messages to be routed through connected peers of the architecture to a destination node. In a P2P architecture all of the peers may be equal, or certain peers may have different functionality often referred to as super nodes. Regardless of the specific P2P architecture employed, a dialog may be established by sending a SIP INVITE message to an end point address over the P2P architecture.

A Session Traversal Utilities for NAT (STUN) server 140 is depicted as being connected to the Internet 102. The STUN server 140 allows addresses of devices behind a NAT to be determined and messages sent to them through the NAT devices. A single STUN server 140 is depicted for clarity of the description; however, it is contemplated that a plurality of STUN servers may be used. In order to determine the public facing IP address of a device behind the NAT device, the STUN server should be located on the public facing side of the NAT device. The STUN server may be used by an end point of an internal network 104, 120 to determine the IP address and port allocated to it by the NAT device 112, 126 as well as to check for connectivity between two end points. STUN binding may be used to gather address information of a device endpoint, which is subsequently included in a candidate list that can be used to check for connectivity between two end points, for example using integrated connectivity establishment (ICE) check technique. Depending on the configuration of NAT devices and firewalls, it is possible that no communication may be established with end points of an internal network.

Although not depicted in FIG. 1, a Traversal Using Relay NAT (TURN) server may also be provided. A TURN server allows an end point outside of an internal network to be connected to an end point of the internal network.

In a network for establishing a dialog between end points using a proxy infrastructure, a SIP proxy server (not shown) would be required in addition to the SIP registrars 110, 128. In such an environment, when a user of an end point 124 of one of the internal networks attempted to establish a dialog with a user of an end point 108 of another internal network 104, a SIP INVITE message would be passed from the end point 124 to the other end point 108 through the SIP proxy and a SIP 200 OK message returned when a dialog was to be established. The SIP registrars 110, 128 provide a mapping between a user or subscriber identifier, such as SIP:Alice@example.com, to an address of an end point associated with the user. Although a SIP proxy server may be used to establish a dialog between two end points, it can be desirable to establish the dialog between two end points by sending the associated SIP messages over a P2P architecture of a plurality of interconnected devices.

When attempting to establish a dialog between two end points using a P2P architecture, it can be difficult to determine the address of an end point that the initial INVITE message is to be sent to. Furthermore, it may be difficult to pass the initial INVITE message to the device through firewalls and NAT devices, unless a hole has been punched by a previous message sent from the device. In order to determine an address to use in establishing a dialog to using a P2P architecture, an intermediary server may be used. The intermediary server may be a SIP registrar that allows end points associated with a SIP user ID to register their address. A STUN server may be used by a device to gather possible addresses associated with it that are subsequently provided in a candidate list to the other end point. Establishing communication over a P2P architecture may result in one way voice, even with successful exchange of signaling messages. Interactive connectivity establishment (ICE) checks may be used to establish, or determine a connection between two endpoints.

Figure 2:
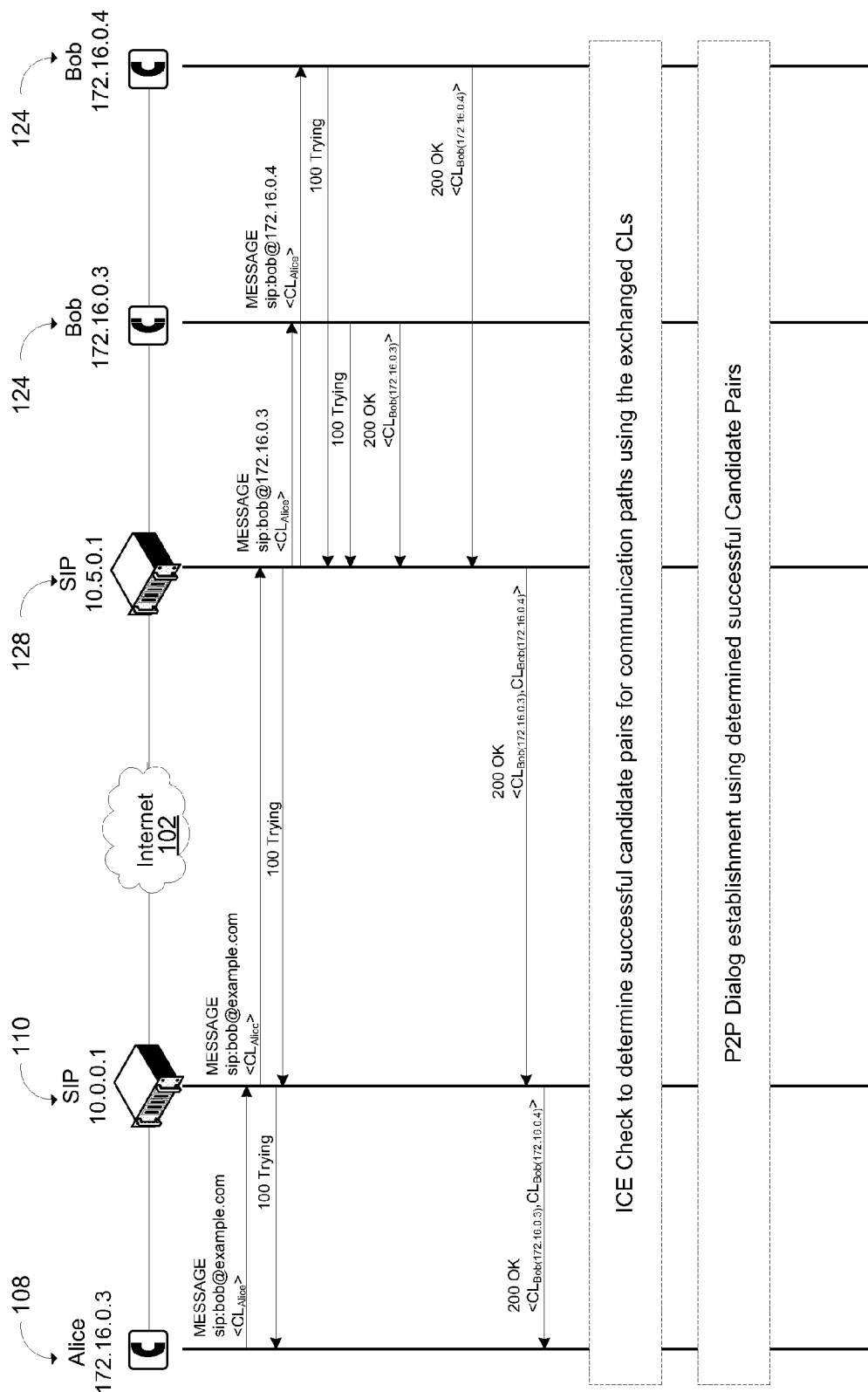
FIG. 2 depicts a message flow for address discovery and dialog establishment.

FIG. 2 depicts a message flow used to discover a communication address of an end point and establishing a dialog with the end point. As depicted the address discovery may be accomplished using a SIP MESSAGE and subsequent ICE checks. The message flow is described with regards to the two internal networks 104, 120. In the message flow of FIG. 2, it is assumed that Alice, a user of an end point device 108 of internal network 120, wishes to establish a call with Bob. It is assumed that Bob has a SIP ID of sip:bob@example.com, which is maintained by the SIP registrar 110. When Alice wishes to establish a call using a P2P architecture, she first attempts to discover a communication address associated with Bob. As depicted in FIG. 2, this is done by Alice sending a SIP MESSAGE message to Bob's SIP address. Alice's end point 108 determines the various possible addresses associated with it. These addresses may include for example a local host address, a server reflexive address provided by a NAT device, a relayed address provided by a relay server, such as a TURN server, and an IP address of a virtual private network (VPN) connection. Alice's end point 128 may use STUN binding to gather these addresses. These possible addresses are included in a Candidate List (CL) of the SIP MESSAGE that Alice sends. The SIP MESSAGE is sent from Alice's end point 108 to the SIP registrar 110 and routed to the SIP registrar of 128 of Bob's network. Upon receiving the SIP MESSAGE, a device may send an intermediary message such as a 100 TRYING message. The SIP registrar 128 determines one or more addresses associated with Bob. For example, Bob may have a desk phone, a mobile phone, as well as a soft phone on his laptop that are registered with him at the registrar and should ring when someone is calling Bob. The SIP registrar 128 receives the SIP MESSAGE, including Alice's CL, and forks the SIP MESSAGE to each end point address associated with Bob. Each end point 124 of Bob's receives the SIP MESSAGE and may gather its possible addresses for contact using STUN binding. As depicted, each end point responds to the SIP MESSAGE with a 200 OK message that includes the CL of the respective end point. Each end point may also begin checking for communication with Alice's endpoint using ICE checks. Once the SIP registrar 128 that forked the messages has received the 200 OK responses from all of the devices, the responses and candidate lists are aggregated and returned to Alice's end point in a 200 OK response. Although described as waiting to receive a 200 OK message, it is possible that one or more end points will return an error message, or the SIP MESSAGE may time out. The SIP Registrar waits for a 200 OK message, an error message or a timeout from all of the forked messages prior to aggregating all of the received responses into a single 200 OK response which is returned to Alice.

Once Alice has received all of the possible addresses for each end point associated with Bob, Alice can begin ICE checks to determine if there are addresses that can be used for communicating between the two endpoints. Candidate pairs between Alice's end point and each end points of Bob for which a CL was returned are determined. A candidate pair provides a possible communication path between Alice and Bob. Similarly each end point of Bob's determines possible candidate pairs using its CL as well as the CL from Alice. Each end point then attempts to establish a connection using the candidate pair. If communication is successful, the candidate pair may be used to subsequently establish a dialog between the two end points. Determining successful candidate pairs, that is addresses for which communication between the two end points can be successfully established, may be done using various techniques. For example, once Alice has received all of the CLs of Bob, she can attempt communicating with them in order. If a response is received from Bob, the candidate pair may be marked as successful. Alice may continue looking for additional successful candidate pairs or may stop with the first one found for each end point.

Once at least one successful candidate pair between Alice and Bob is determined, a dialog can be established using a P2P architecture and without requiring further intervention from the SIP registrar or a SIP proxy. Alice may send an individual INVITE message over a P2P architecture using a determined successful candidate pair associated with each of Bob's end point devices, causing each device to ring. Once Bob picks up one end point device, a dialog is established and Alice may cancel the other pending INVITE messages.

Although the message flow of FIG. 2 can be used to determine an address to use in establishing a dialog with an end point using a P2P architecture, it may have undesirable latency if one or more of Bob's end point devices do not respond to the 200 OK response. Since the SIP Registrar 128 waits until all responses have been determined, either by receiving a 200 OK, an error message, or a timeout, Alice will wait for the slowest response before receiving any CLs. This timeout delay may be for example 32 seconds.

Figure 3:
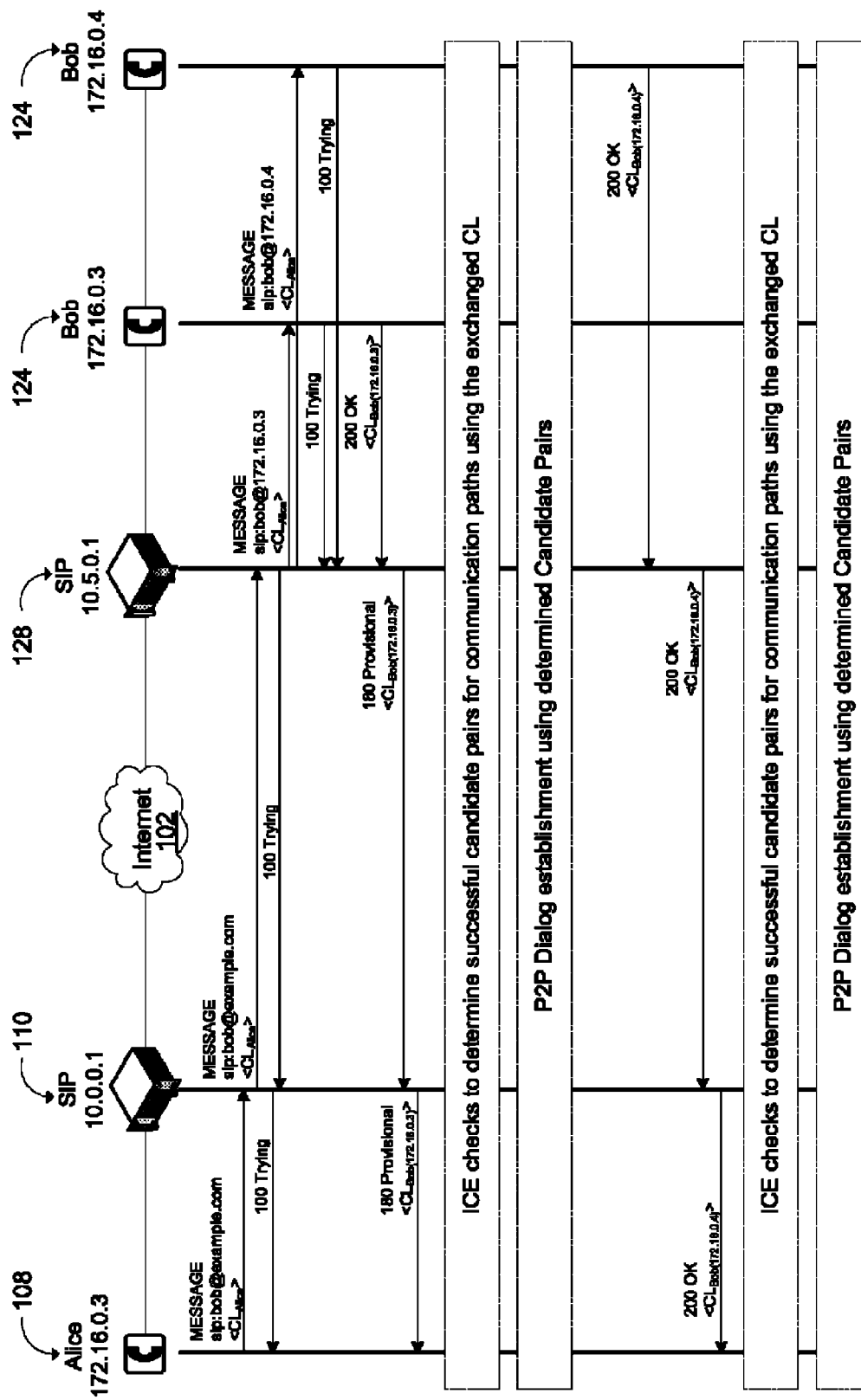
FIG. 3 depicts a message flow for early address discovery and dialog establishment.

FIG. 3 depicts a message flow for early address discovery and dialog establishment. The message flow uses SIP MESSAGE for early address discovery and ICE checks. The message flow is similar to the message flow described above, however, the SIP registrar sends CLs back to Alice as they are received. As described further, when the SIP registrar receives a 200 OK message from one of the end points, it determines if there are any further end points that have not responded, and if there are further end points to respond, the SIP registrar returns a 180 Provisional message containing the CL. If there are no further end points to respond, the SIP registrar forwards the CL in a 200 OK response.

Alice begins the dialog establishment by determining possible addresses that may be used to communicate with at least one end point associated with Bob, which may be done using STUN binding. Alice sends a SIP MESSAGE to Bob, which includes Alice's CL. The SIP MESSAGE is routed to Bob's SIP Registrar 128. When the SIP MESSAGE is received at Bob's SIP Registrar, it determines an address for any end points registered with Bob's SIP address. The SIP Registrar forks the received SIP MESSAGE and sends it to each registered end point associated with Bob's SIP ID. Upon receiving the SIP MESSAGE, each of Bob's end points sends a 200 OK response back to the SIP Registrar 128 with their respective candidate list, which may be determined using STUN binding. Once one of Bob's end points has received Alice's CL and determined its own CL, it may begin ICE checks to establish a possible communication path with Alice. Unlike the SIP Registrar described above with regards to FIG. 2, the SIP registrar 128 in FIG. 3 does not wait to receive all responses from the end points. As depicted, once the SIP Registrar receives a 200 OK response back from one of the end points it forwards the received CL in the 200 OK message to Alice's end point in a 180 Provisional message. Once Alice's end point receives the 180 Provisional response, Alice's end point can begin determining a successful candidate pair to use for establishing a communication dialog with, which may be done using ICE checks. Once a successful candidate pair is determined, Alice may attempt to immediately establish a dialog with the end point using a P2P network infrastructure.

When the SIP registrar 110 receives the final 200 OK message from the end points, it forwards a 200 OK message, including Bob's CL received in the 200 OK message, to Alice. Upon receiving the 200 OK message, Alice may attempt to determine a successful candidate pair and then establish a dialog with the end point device. However, if Alice has already established a dialog with one of Bob's end points, it may be desirable to take no further actions.

Although the above has described Bob's end points as replying with a 200 OK message, it is possible that instead, one or more would reply with an error message. If an error message is received, the SIP Registrar does not need to send a 180 Provisional message to Alice; however, if it is the last response a 200 OK message is sent to Alice that does not contain a CL. Additionally, if no message is received for a period of time, that is the SIP MESSAGE times out, an empty 200 OK response message may also be sent, assuming that all of the other end points have sent a 200 OK message or an error message.

As a result of the message flows described above with regards to FIGS. 2 and 3, it is possible to discover an address for use in communicating with an end point and to establish a dialog with the end point using a P2P architecture. Additionally, it is possible to receive possible addresses early in 180 Provisional messages and as such quickly attempt to establish a dialog to one or more end point devices without having to wait for all of the forked SIP MESSAGE transactions to the end points to complete.

Figure 4:
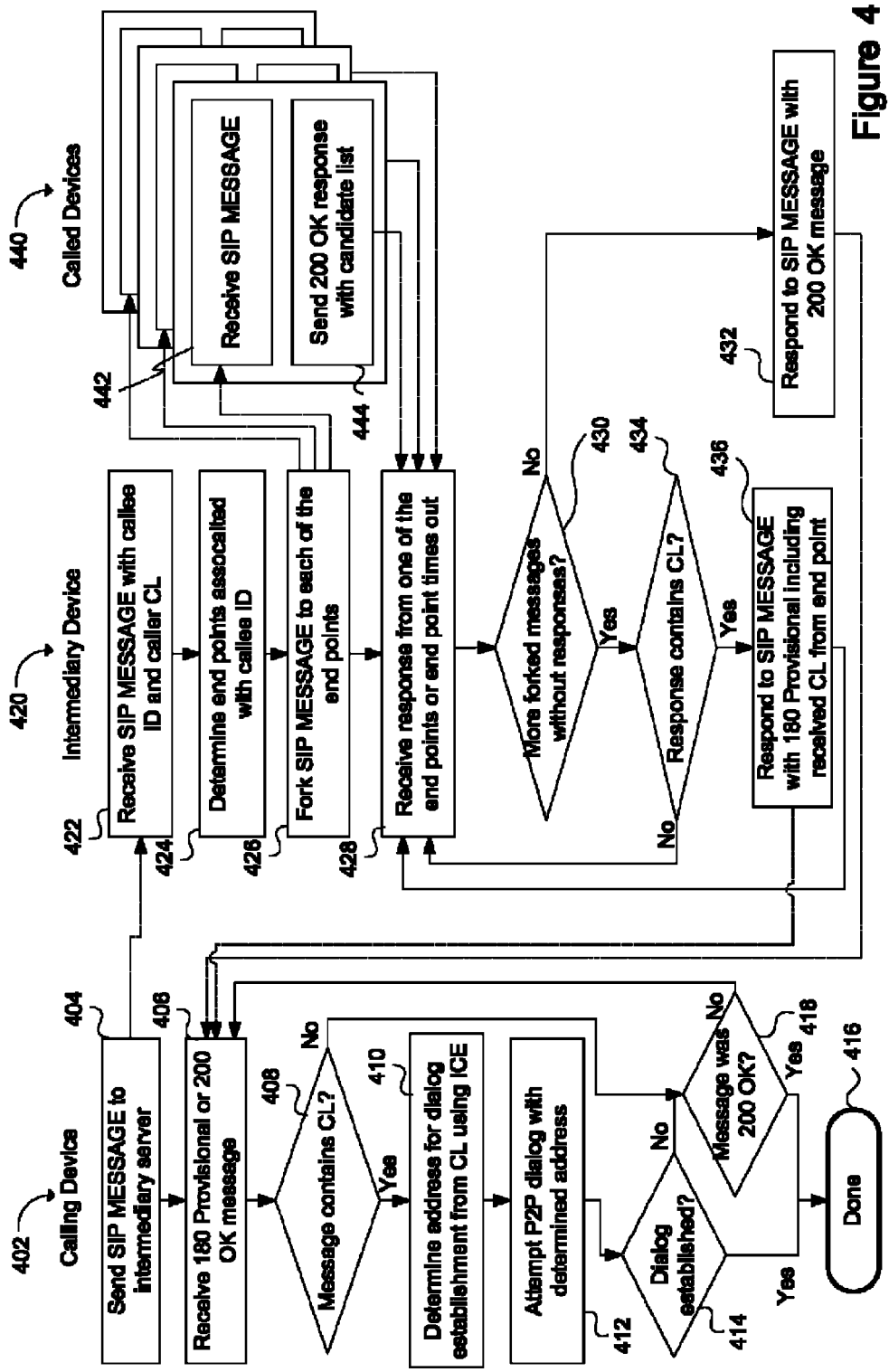
FIG. 4 depicts in a flow diagram a method for early address discovery and dialog establishment.

FIG. 4 depicts in a flow diagram a method for early address discovery and dialog establishment. The method uses SIP MESSAGE for the early address discovery and ICE checks. The flow diagram depicts methods that are implemented by various devices in the network environment. In particular the method implemented at a calling device 402, an intermediary server 420 such as a SIP Registrar server of the party being called and a plurality of called devices 440, each registered at the intermediary server 420 to the party being called. In the flow diagram 400 it is assumed that the Calling device 402 attempts to establish a dialog with any called device as soon as possible, and once a dialog is established, no other dialogs are established.

A calling device 402 sends a SIP MESSAGE to an intermediary server 420 (404). The SIP MESSAGE initiates a transaction between the intermediary server 420 and the calling device 402. The SIP MESSAGE includes a CL of the calling device comprising possible addresses for communicating with the calling device. The calling device may determine the possible addresses in various ways, including using a STUN/TURN server as will be appreciated. As described further, the intermediary server 420 will respond to the SIP MESSAGE with zero or more 180 Provisional messages, each of which contains a CL of a called device associated with the party being called. The intermediary server 420 also sends a final 200 OK response that may or may not contain a CL depending on if the last of the called devices responded with a CL or not.

The calling device 402 receives the 180 Provisional or 200 OK message from the intermediary server 420 (406) and determines if the message has a CL (408). If the received message does have a CL (Yes at 408), the calling device 402 attempts to determine an address to use in establishing a dialog from the received CL (410). In determining an address to use for the dialog between the calling device 402 and the called device 440, ICE checks may be used to establish a connection and proper address bindings in any intermediary firewalls and NAT servers between the end points.

Once the address is determined, the calling device 402 attempts to establish a dialog (412) with called device 440 associated with the received message. The process of establishing the dialog is not detailed in FIG. 4, however the process may use a P2P method of sending an INVITE message to the called device. After attempting to establish a dialog, it is determined if the dialog establishment was successful (414) and if it was (Yes at 414), the process completes (416). It is noted that additional messages received after the process completes should still be responded to in accordance with the communication protocol used. For example, even if a P2P dialog has already been established based on a CL received in a 180 Provisional response, the calling device 402 should still respond to a received 200 OK message with an ACK message.

If the dialog establishment was not successful (No at 414) the calling device determines if the received message was a 200 OK message (418) and if it was (Yes at 418) the process is done (416) since no further messages will be received. If the message was not a 200 OK message (No at 418) the process returns to receive another 180 Provisional message or 200 OK message (406). Once the message is received it is determined if it contains a CL (408). If the message does not contain a CL (No at 408) it is determined if the message is a 200 OK message (418) and if it is (Yes at 418) the process is done. In the example described with regards to FIG. 4, it may not be necessary to check if the message that has no CL was a 200 OK message since 180 Provisional messages are not sent without a CL.

Turning to the intermediary server 420, a SIP transaction between the calling device 402 and the intermediary server 420 is initiated by receiving the SIP MESSAGE (422) sent from the calling device 402. The SIP MESSAGE includes an identifier of the party being called, referred to as the recipient ID, as well as a candidate list from the calling device 402 that can be used by the called devices when determining an address for dialog establishment. Upon receiving the SIP MESSAGE, the intermediary server determines end points associated with the recipient ID (424). Each end point associated with the recipient ID may register with the intermediary server 420. As a result of the registering process the intermediary server 420 is able to determine an address to use to communicate the SIP MESSAGE and associated messages to the end point. It is noted that the address that intermediary server uses to communicate with the end points may not be useable by the calling device 402 for establishing the dialog, for example due to intervening NAT servers and/or firewalls. Once the end points associated with the recipient ID are determined, the received SIP MESSAGE is forked to each of the end points 440 (426). After the SIP MESSAGE is forked a response will be received from each of the end points, or the end point will time out. The intermediary server 420 receives a response from one of the end points, or determines that one of the end points has timed out, (428) and determines if there are more forked SIP MESSAGES without a received response or timeout (430). If there are no more forked SIP MESSAGES (No at 430) the SIP MESSAGE is responded to using a 200 OK response (432). If a 200 OK response was received it is forwarded on, which may or may not contain a CL. If the end point timed out, a 200 OK response is sent without a CL.

If it is determined that there are more forked messages without responses (Yes at 430), it is determined if the received response contains a CL (434) and if it does not (No at 434) no message is sent back to the calling device 402 and the intermediary server waits to receive a further response from one of the end points (428). If the received response does contain a CL (Yes at 434) a 180 Provisional message is sent back to the calling device that includes the received CL (436). Once the intermediary server sends the 200 OK response back to the calling device the SIP MESSAGE transaction is completed.

Turning to the called devices 440, each of the called devices receives a SIP MESSAGE (442) and sends a 200 OK response with its CL (444). The determining of the address for dialog establishment is not depicted in FIG. 4, however it may include responding to a request message received from the calling device. Furthermore, the called devices are assumed to return a 200 OK message, it is also possible that they don't send a message at all or send an error message.

Figure 5:
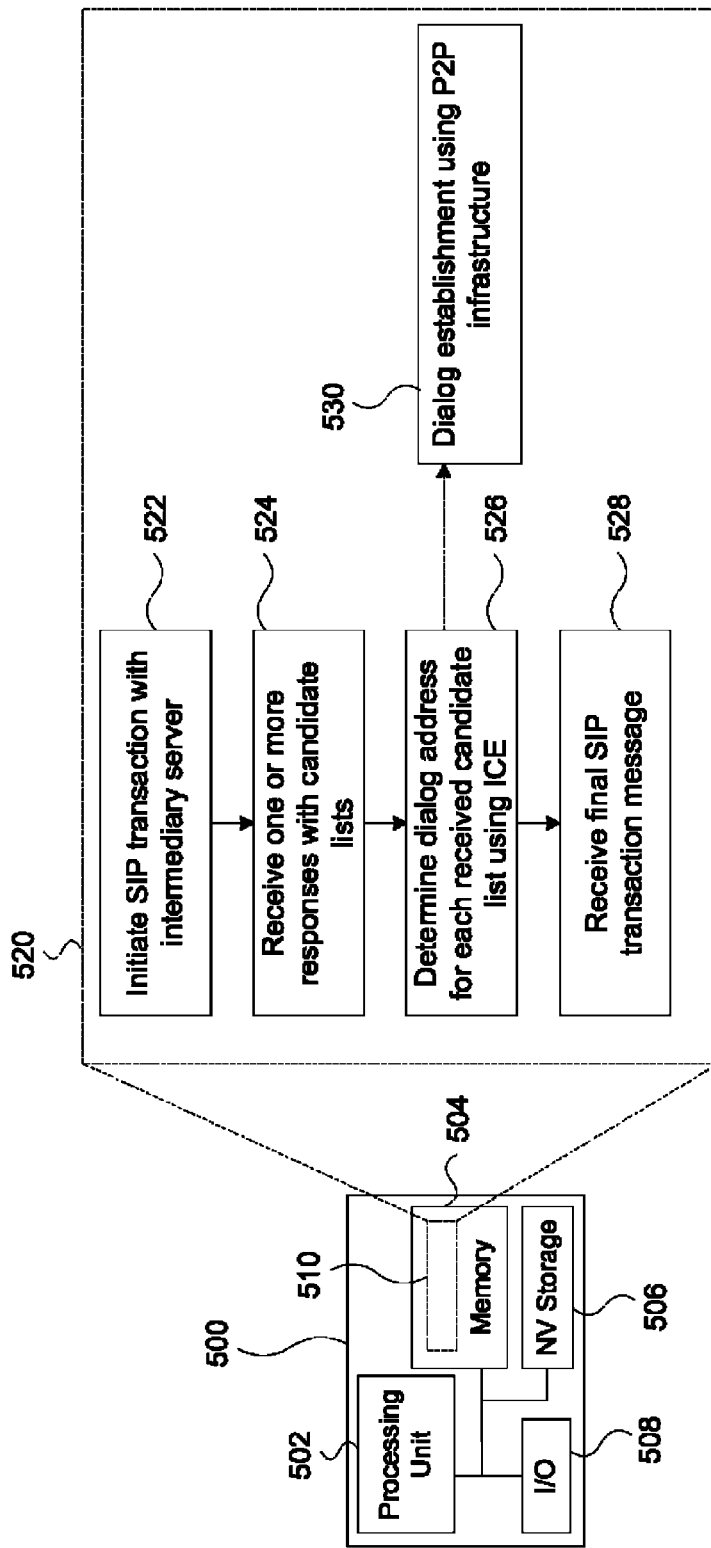
FIG. 5 depicts in an end point device a method for performing early address discovery and dialog establishment.

FIG. 5 depicts an end point device for performing early address discovery and dialog establishment. The end point device 500 may provide functionality for carrying out a method according to FIG. 4, and in particular the portion of the method 400 described as being carried out by the calling device. As described above, the decision of when the end point device actually attempts to establish a dialog may vary depending on the configuration of the end point device. The end point device described with regards to FIG. 5, provides for the early determination of addresses that can be used to establish the dialog, regardless of when the end point device actually establishes or attempts to establish the dialog.

The end point device 500 comprises a processing unit 502, which may be provided by a single or multi-core central processing unit (CPU), a microcontroller or a plurality of processing units combined together, and memory 504 connected to the processing unit 502. The memory 504 may comprise random access memory (RAM) or other types of memory and may be provided separately from the processing unit 502, as part of the processing unit 502, or a combination thereof. The end point device 500 may further comprise non volatile storage 506 for providing storage when the system 500 is powered off. The system 500 may further comprise an input/output (I/O) interface 508 for connecting other devices or components to the processing unit 502. For example, a display, keyboard, keypad, touch screen or other input and/or output device may be connected to the end point device 500. It is contemplated that the end point device may be embodied by numerous different computing devices, including for example, personal computers, laptop or tablet computer, handheld devices including cellular phones smart phones and personal digital assistants (PDAs), and/or VoIP enabled handsets.

The memory 504 stores instructions, that when executed by the processing unit 502 configure the end point device 500 to provide the dialog establishment functionality 510. The dialog establishment functionality 510 comprises functionality implementing a method 520 for determining an address to establish the dialog with using an intermediary server, such as a SIP registrar and establishing the dialog to a determined address using a P2P architecture. The intermediary server comprises functionality for sending received CLs when they are received in a 180 Provisional message. The dialog is established with a determined address once one or more addresses that can support a dialog are determined.

Determining an address using an intermediary device such as a SIP registrar server, comprises initiating a SIP transaction with the intermediary device 522, receiving one or more responses each having a candidate list from an end point 524, determining an address for dialog establishment for each received candidate list 526 and receiving a final SIP transaction message 528, which completes the SIP transaction initiated with the intermediary device. The SIP transaction may be initiated by sending a SIP MESSAGE from the initiating end point device. The message used to initiate the SIP transaction includes an identifier of the party to establish the dialog with as well as a candidate list of the initiating end point device. The initiating end point device may receive the one or more responses with respective candidate lists in provisional messages. The address to use when attempting to establish the dialog with one of the devices associated with the called party can be determined from the received candidate lists using ICE checks. The address to use may be the address for which communication was successfully established with the end point device of the party being called by the ICE checks. The final SIP transaction may be, for example a 200 OK message. The final SIP transaction message may include a candidate list, or it may have no candidate list. If the final SIP transaction message has a candidate list, then an address may be determined from the candidate list of the final SIP transaction message. As will be appreciated, the functionality for establishing the dialog using the P2P architecture 530 may attempt to establish a dialog with an end point as soon as an address is determined, or other considerations may be used in determining when to attempt the dialog establishment. For example, it may be desirable to attempt dialog establishment with each end point serially in a preferred order. Other considerations for deciding when to attempt establishing the dialogs are possible.

The above has described using a SIP MESSAGE transaction between an end point and an intermediary server for determining an address of one or more end points to which a dialog can be established. A dialog to one or more of the determined addresses may be established using a P2P architecture. It is contemplated that another transaction could be used instead of the SIP MESSAGE. For example, CLs could be returned to the calling party in a SIP OPTIONS transaction. Further, a separate transaction could be defined to support the exchange of address information.

It will be appreciated that not all possible embodiments have been described in detail. However, having regard to the current description, it will be appreciated how to modify the embodiments described in detail herein to provide the features and functionality of other possible embodiments. The devices, systems and methods described herein have been described with reference to various examples. It will be appreciated that systems, devices, components, methods and/or steps from the various examples may be combined together, removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

In some embodiments, any suitable computer readable memory can be used for storing instructions for performing the processes described herein. For example, in some embodiments, computer readable media can be transitory or non-transitory. For example, non-transitory computer readable media can include non-volatile computer storage memory or media such as magnetic media (such as hard disks), optical media (such as compact discs, digital video discs, Blu-ray discs, etc.), semiconductor media (such as flash memory, read only memory (ROM), Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of establishing a communication dialog between two end points using peer-to-peer (P2P) messaging, the method comprising:
    initiating from an initiating end point a session initiation protocol (SIP) transaction with an intermediary server by sending a SIP message comprising a recipient identifier (ID) of a desired party of the communication dialog, and an initiator candidate list of possible communication addresses of the initiating end point;
    receiving at the initiating end point at least one provisional response each comprising a respective recipient candidate list of possible communication addresses of a respective recipient end point of a plurality of recipient end points associated with the recipient ID;
    determining at least one address to establish the communication dialog with, from the at least one received recipient candidate lists, each of the at least one determined addresses for use in establishing the communication dialog between the initiating end point and the respective recipient end point;
    receiving a final response of the SIP transaction from a further one of the plurality of recipient end points; and
    attempting to establish the communication dialog using a P2P architecture between the initiating end point and one or more of the determined at least one address.

2. The method of claim 1, wherein determining the at least one address further comprises:
    receiving at the initiator end point an additional provisional response comprising a second recipient candidate list of possible communication addresses of a second recipient end point of the plurality of recipient end points; and
    determining an address to establish a dialog with from the second recipient candidate list for use in establishing the communication dialog between the initiating end point and the second recipient end point.

3. The method of claim 1, wherein determining the at least one address further comprises:

determining if the final response of the SIP transaction comprises a final recipient candidate list of possible communication addresses of a final recipient end point of the plurality of recipient end points; and when the final response does comprise a final recipient candidate list, determining an address to establish a dialog with from the final recipient candidate list for use in establishing the communication dialog between the initiating end point and final recipient end point.

4. The method of claim 1, wherein attempting to establish the communication dialog over the P2P architecture between the initiating end point and one or more of the determined at least one address is performed upon determining each address of the at least one address until the communication dialog is established with one of the recipient end points or the attempt is cancelled.

5. The method of claim 1, wherein determining the at least one address to establish the communication dialog with comprises sending a query message to each communication address on the candidate list until a response is received from the recipient end point.

6. The method of claim 5, wherein determining the at least one address to establish the communication dialog with further comprises receiving a query message from a communication address on the candidate list and sending a response message to the communication address, wherein the at least one address is the communication address from which the response message is received and from which a query message is received.

7. The method of claim 1, wherein determining the at least one address to establish the communication dialog comprises using an interactive connectivity establishment (ICE) check.

8. The method of claim 1, further comprising:
receiving the SIP message initiating the SIP transaction at the intermediary server;
determining the plurality of recipient end points associated with the recipient ID;
initiating respective SIP transactions to each of the plurality of recipient end points by forking the received SIP message to each of the plurality of recipient end points;
receiving a first response from one of the plurality of recipient end points comprising a candidate list;
responsive to receiving the first response comprising the candidate list, sending the candidate list as a first recipient candidate list of the at least one recipient candidate list to the initiating end point in a provisional response; and
responsive to determining that all initiated SIP transactions with the plurality of recipient end points have completed, sending the final response of the SIP transaction with the initiating end point initiated by the received SIP message.

9. The method of claim 8, wherein the initiated SIP transactions are determined to be completed by receiving a final message, an error message, or a timeout occurring.

10. The method of claim 9, wherein the final response of the SIP transaction comprises one of:
a candidate list when the final SIP transaction completed with a final message containing the final candidate list; or
an empty body when the final SIP transaction completed with a final message having no candidate list, an error or timed out.

11. The method of claim 1, wherein the SIP transaction comprises a SIP MESSAGE transaction or a SIP OPTIONS transaction, wherein the final response of the SIP transaction comprises a 200 OK response, and wherein each of the provisional responses comprises a 180 Provisional response.

12. A device for establishing a communication dialog between two end points using peer-to-peer (P2P) messaging, the device comprising:
a memory storing instruction; and
a processor executing instructions stored in the memory, the instructions when executed by the processor configuring the device to provide:
initiation, from an initiating end point, of a session initiation protocol (SIP) transaction with an intermediary server by sending a SIP message comprising a recipient identifier (ID) of a desired party of the communication dialog, and an initiator candidate list of possible communication addresses of the initiating end point;
receipt, at the initiating end point, of at least one provisional response each comprising a respective recipient candidate list of possible communication addresses of a respective recipient end point of a plurality of recipient end points associated with the recipient ID;
determination of at least one address to establish the communication dialog with from the at least one received recipient candidate lists, each of the at least one determined addresses for use in establishing the communication dialog between the initiating end point and the respective recipient end point;
receipt of a final response of the SIP transaction from a further one of the plurality of recipient end points; and
establishment of the communication dialog using a P2P architecture between the initiating end point and at least one of the determined one or more addresses.

13. The device of claim 12, wherein determination of the at least one address further comprises:
receiving at the initiating end point an additional provisional response comprising a second recipient candidate list of possible communication addresses of a second recipient end point of the plurality of recipient end points; and
determining an address to establish the communication dialog with from the second recipient candidate list for use in establishing a dialog between the initiating end point and the second recipient end point.

14. The device of claim 12, wherein determination of the at least one address further comprises:
determining if the final response of the SIP transaction comprises a final recipient candidate list of possible communication addresses of a final recipient end point of the plurality of recipient end points; and
when the final recipient response does comprise a final recipient candidate list, determining an address to establish the communication dialog with from the final recipient candidate list for use in establishing a dialog between the initiating end point and final recipient end point.

15. The device of claim 12, wherein the communication dialog establishment over a P2P architecture between the initiating end point and one or more of the determined at least one address is performed upon determining each address of the at least one address until the communication dialog is established with one of the recipient end points or the attempt is cancelled.

16. The device of claim 12, wherein determination of the at least one address to establish the communication dialog with comprises sending a query message to each communication address on a candidate list until a response is received from the recipient end point.

17. The device of claim 16, wherein determination of the at least one address to establish the communication dialog with further comprises receiving a query message from a communication address on the candidate list and sending a response message to the communication address, wherein the at least one address is the communication address from which the response message is received and from which a query message is received.

18. The device of claim 12, wherein determination of the at least one address to establish the communication dialog comprises using an interactive connectivity establishment (ICE) check.

19. The device of claim 12, wherein the SIP transaction comprises a SIP MESSAGE transaction or a SIP OPTIONS transaction, wherein the final response of the SIP transaction comprises a 200 OK response, and wherein each of the provisional responses comprises a 180 Provisional response.

20. A computer readable memory comprising instructions that when executed by a processor of a device configure the device to provide:

initiation, from an initiating end point, of a session initiation protocol (SIP) transaction with an intermediary server by sending a SIP message comprising a recipient identifier (ID) of a desired party of the communication dialog, and an initiator candidate list of possible communication addresses of the initiating end point;

receipt, at the initiating end point, of at least one provisional response each comprising a respective recipient candidate list of possible communication addresses of a respective recipient end point of a plurality of recipient end points associated with the recipient ID;

determination of at least one address to establish the communication dialog with from the at least one received recipient candidate lists, each of the at least one determined addresses for use in establishing the communication dialog between the initiating end point and the respective recipient end point; and receipt of a final response of the SIP transaction from a further one of the plurality of recipient end points;

establishment of the communication dialog using a P2P architecture between the initiating end point and at least one of the determined one or more addresses.

* * * * *